US006029599A

United States Patent [19]

Hiltner, Jr.

[11] Patent Number: 6,029,599

[45] Date of Patent: Feb. 29, 2000

[54] GOLF PIN STAND

[76] Inventor: Harry F. Hiltner, Jr., 2405 Shepherd Cir., Northfield, N.J. 08225

[21] Appl. No.: 09/089,342

[22] Filed: Jun. 3, 1998

Related U.S. Application Data

[60] Provisional application No. 60/063,849, Oct. 31, 1997.

[51] Int. Cl.[7] .......................... G09F 17/00; A63B 57/00; F16M 11/00

[52] U.S. Cl. .......................... 116/173; 473/176; 248/166; 248/176.1

[58] Field of Search ............................ 116/173; 248/156, 248/166, 176.1; 211/70.2; 473/176; 273/178 B, 34 A

[56] References Cited

U.S. PATENT DOCUMENTS

| | | | |
|---|---|---|---|
| 663,761 | 12/1900 | Johnson | 473/176 |
| 3,310,026 | 3/1967 | Baird, Jr. | 116/173 |
| 3,826,326 | 7/1974 | Blair | 180/210 |
| 3,915,101 | 10/1975 | Onori | 108/192 |
| 3,961,804 | 6/1976 | Blanton | 280/89.11 |
| 4,043,070 | 8/1977 | Lamothe | 43/21.2 |
| 4,473,318 | 9/1984 | Schrock | 403/404 |
| 4,545,579 | 10/1985 | McCain | 473/282 |
| 4,991,839 | 2/1991 | Lumbattis, Jr. | 473/282 |
| 4,993,635 | 2/1991 | Dupre | 239/14.2 |
| 5,025,715 | 6/1991 | Sir | 99/421 HV |
| 5,255,627 | 10/1993 | Williams | 116/174 |
| 5,390,916 | 2/1995 | Govoni | 473/282 |
| 5,467,980 | 11/1995 | Weisenstein | 473/282 |
| 5,474,175 | 12/1995 | Gattis | 206/315.3 |
| 5,482,247 | 1/1996 | Smith | 248/688 |
| 5,492,230 | 2/1996 | Horton | 211/70.2 |

*Primary Examiner*—Diego Gutierrez
*Assistant Examiner*—R A Smith
*Attorney, Agent, or Firm*—Richard C. Litman

[57] ABSTRACT

A golf pin stand device comprising a connector and a pair of leg members which, when attached to a golf pin, supports a golf pin above ground in a tripod configuration. The connector is adapted to connect to the shaft of a golf pin. The leg members are pivotally attached to the connector and freely move relative to the connector between a retracted position when the pin is in a vertical position and an extended position when the pin is in a horizontal position. The device allows the pin to be removed from a hole and set aside in a supported position such that, when resetting the pin, a golfer need not bend down to the green to retrieve the pin. The pin, while supported above the surface of the green by the pair of leg members, can be used to support at least one golf club thereby keeping the golf club handle high enough above the ground to keep the grip clean and dry.

6 Claims, 3 Drawing Sheets

GOLF PIN STAND

CROSS-REFERENCE TO RELATED APPLICATION

This application claims the benefit of U.S. Provisional Patent Application Serial No. 60/063,849, filed Oct. 31, 1997.

BACKGROUND OF THE INVENTION

1. Field of the Invention

The invention is understood to relate generally to golf accessories and more specifically to an attachment for supporting a golf flag pin.

2. Description of Related Art

Devices have been proposed by which a golf club may be supported above the surface of the ground to keep the golf club handle high enough to keep the grip clean and dry when the club is laid down during the course of the game. Such devices are well known in the prior art as evidenced by the U.S. Patents to Iona I. McCain, U.S. Pat. No. 4,545,579; John R. Lumbattis, U.S. Pat. No. 4,991,839; David A. Govoni, U.S. Pat. No. 5,390,916; Larry Weisenstein, U.S. Pat. No. 5,467,980; Jerry R. Smith, U.S. Pat. No. 5,482,247; and Russell B. Horton, U.S. Pat. No. 5,492,230.

Similar devices which eliminate the necessity for a golfer to bend over, in order to pick up a golf pin when the pin is lying on the ground, have also been proposed, as evidenced by the U.S. Patent to Roger P. Baird, Jr., U.S. Pat. No. 3,310,026.

A final invention related to flagpoles is described in U.S. Pat. No. 5,255,627, issued to Herbert T. Williams. Mr. Williams' invention is an arm pivotally mounted to a flagpole and clipping to the bottom of a flag, preventing the flag from wrapping completely around the flagpole.

However, none of the prior art discloses an apparatus by which a golf pin may be supported above the surface of the ground thereby eliminating the necessity for golfer to bend over in order to pick up a golf pin. Nor does any of the prior art golf pin apparatus at the same time provide support for a golf club thereby keeping the golf club handle high enough above the ground to keep the grip clean and dry.

None of the above inventions and patents, taken either singly or in combination, is seen to describe the instant invention as claimed.

SUMMARY OF THE INVENTION

The present invention is a golf pin-stand device that generally comprises a connector and a pair of leg members, together intended to support a golf pin above the surface of the ground. The connector is adapted to connect to the shaft of a golf pin. The leg members are pivotally attached to the connector and move freely relative to the connector between a retracted position, when the pin is in a vertical position, and an extended position, when the pin is in a horizontal position. The device allows the pin to be removed from a hole and set aside in a supported position, such that when resetting the pin, a golfer need not bend down to the green to retrieve the pin. Further, when the leg members are in an extended position substantially perpendicular to the pin and the pin is thereby supported, the pin and leg assembly serves as a tripod to support at least one golf club by keeping the golf club handle high enough above the ground to keep the grip clean and dry.

Accordingly, it is a principal object of the invention to provide an apparatus by which a golf pin may be supported above the surface of the ground thereby eliminating the necessity for golfer to bend over in order to pick up a golf pin.

It is another object of the invention to provide a support for a golf club, thereby keeping the golf club handle high enough above the ground to keep the grip clean and dry.

It is a further object of the invention to provide a golf pin support having leg members that are pivotally attached to the pin and that move freely relative thereto, between a retracted position when the pin is vertical and an extended position when the pin is horizontal.

Still another object of the invention is to provide a connector by which the leg members are pivotally attached to a golf pin.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

Figure 1:
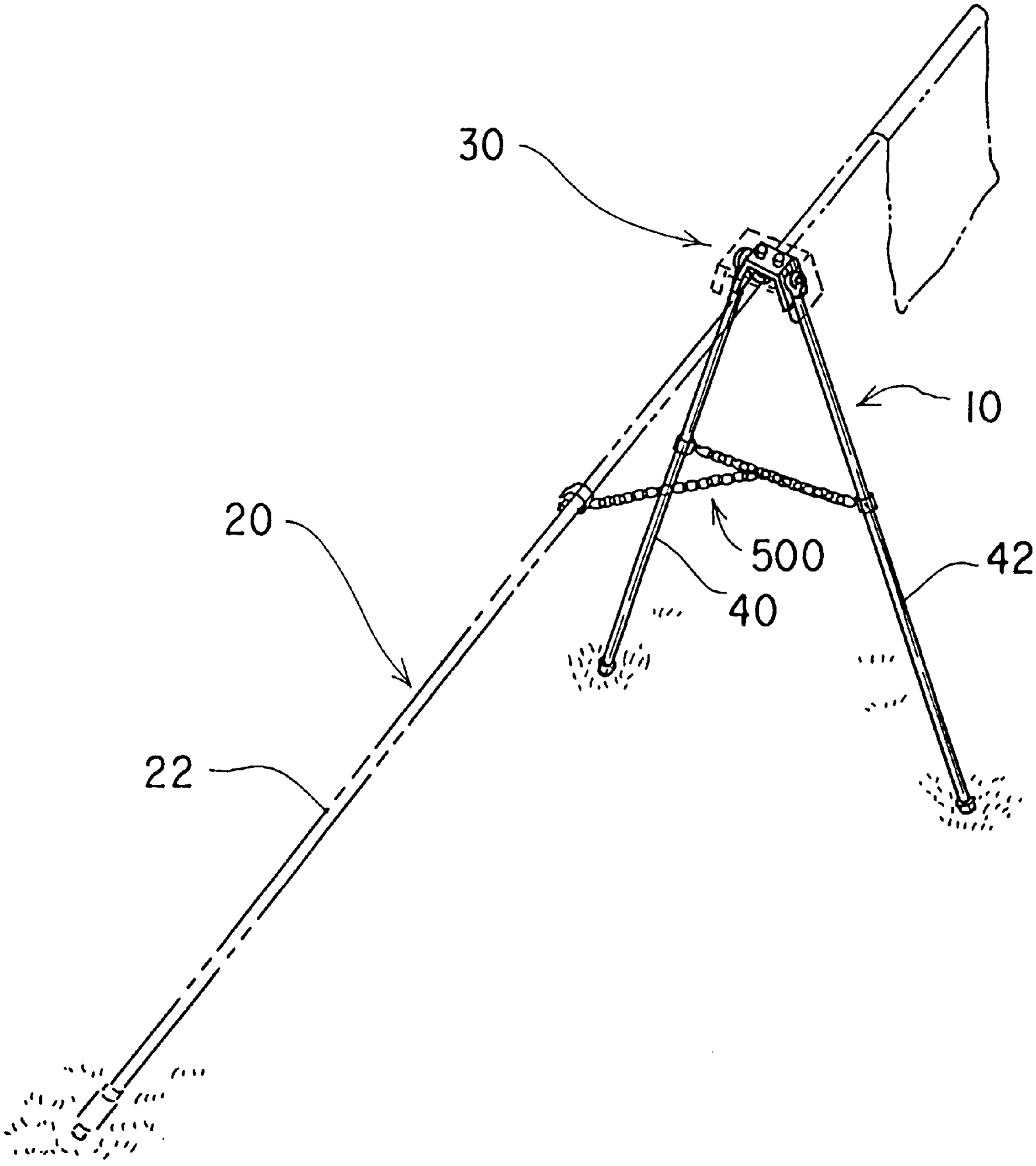
FIG. 1 is an environmental perspective view of the golf pin-stand according to the present invention.

Referring to the figures by numerals of reference, and first to FIG. 1, a golf pin-stand device generally designated by the reference numeral 10 will be described. The device comprises a connector 30 adapted to connect to a shaft 22 of a golf pin 20 and a left leg member 40 and right leg member 42 each of which is pivotally attached to the connector 30. The leg members 40, 42 pivot freely relative to the connector 30 between an extended position perpendicular to shaft 22 of the pin 20, when the pin 20 is in a horizontal position and a retracted position, as shown in FIG. 2, parallel to the shaft 22 of the pin 20, when the pin 20 is in a vertical position.

Figure 3:
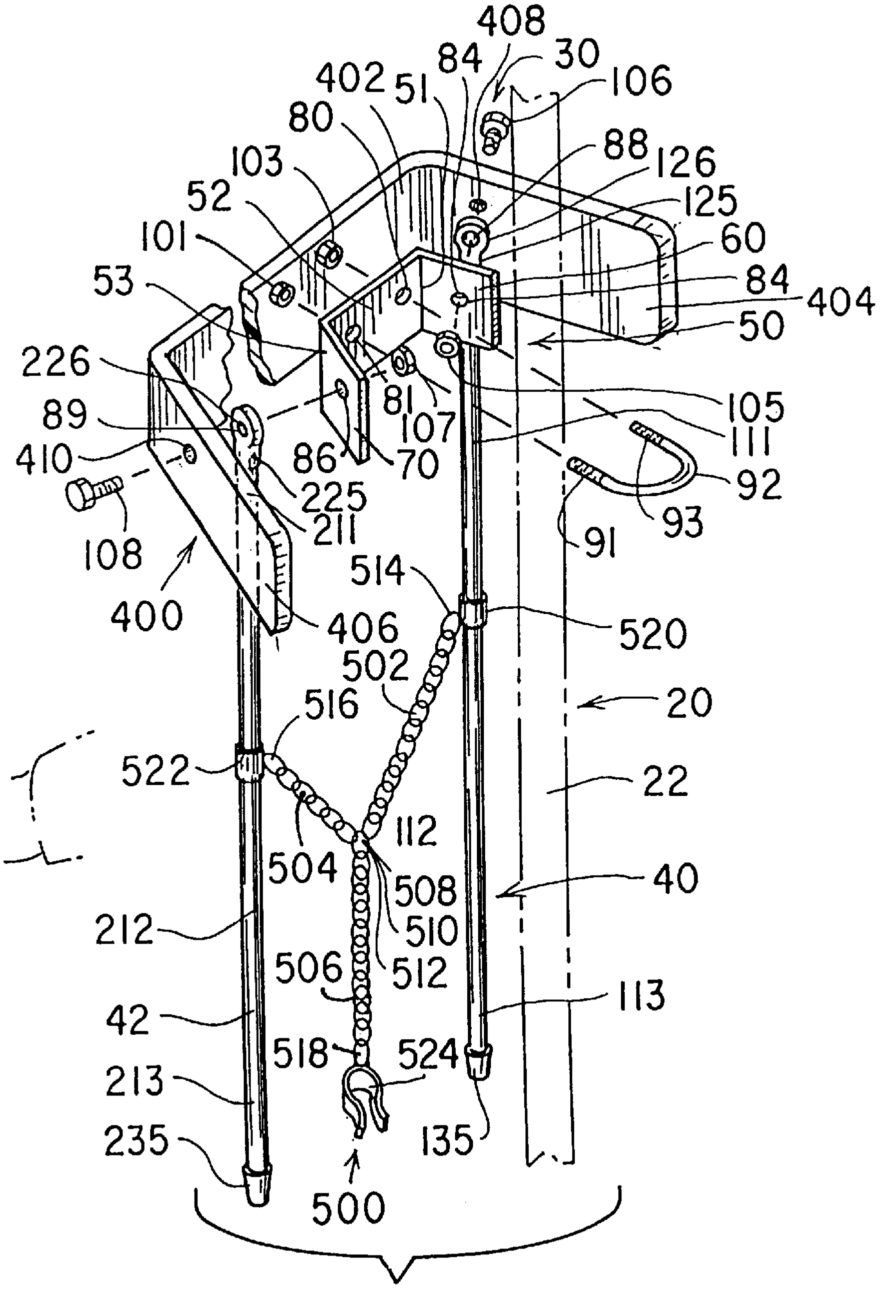
FIG. 3 is exploded perspective view of the golf pin-stand.

Referring now to FIG. 3, the connector 30 is attached by a clamping action to the shaft 22 of a golf pin 20 and the left and right leg members 40, 42 are pivotally attached to the connector 30. The connector 30 is a clamping device having a substantially "U" shaped elongated plate 50 including a central plate 52 having two apertures 80, 81 therein, a left end 51 and a right end 53. A left end plate 60 projects at an obtuse angle from the left end 51 of the central plate 52 and has an aperture therein 84. A right end plate 70 also projects at an obtuse angle from the right end 53 of the central plate 52 and has an aperture 86 therein. A "C" bolt 92 having threaded free ends 91, 93 which are intended to pass through the two apertures 80, 81 within the central plate 52 are secured thereto by complementarily threaded nut type fasteners 101, 103. As the threaded nut type fasteners 101, 103 are tightened, the shaft 22 of a golf pin 20 may be clamped between the "C" bolt 92 and the central plate 52. Suitable washers (not shown) may be provided on the ends 91, 93, behind each nut 101, 103, respectively.

The left leg member 40 of the stand 10 includes an elongated rod 112, having a first end 111 and a second end 113. A pivotal rod cap 125 is attached to the first end 111 of the rod 112. The pivotal rod cap 125 has a substantially flat protrusion 126 with an aperture 88 therein perpendicular to the rod 112 which is pivotally secured by nut 105 and bolt 106 type fasteners to the left aperture 84 of the left end plate 60. A rod end cap 135, adapted for engagement with a soft ground surface, is attached to the second end 113 of the rod 112. The right leg member 42 of the stand 10 includes an elongated rod 212, having a first end 211 and a second end 213. A pivotal rod cap 225 is attached to the first end 211 of the rod 212. The pivotal rod cap 225 has a substantially flat protrusion 226 with an aperture 89 therein perpendicular to the rod 212 which is pivotally secured by nut 107 and bolt 108 type fasteners to the aperture 86 in the right end plate 70. A rod end cap 235, adapted for engagement with a soft ground surface, is attached to the second end 213 of the rod 212. It should be noted here that the nut and bolt assemblies 105, 106 and 107, 108 are illustrated in simplified, basic fashion so as not to detract from the rest of the view. Each assembly, preferably, is made up of (from outside in, toward and through plate ends 51, 53): a round head bolt and star washer, bolt through the tapped hole, and a washer, the bolt passing through the aperture 88 or 89, followed by another washer and a nylon-lined nut to complete the assembly (not shown). This arrangement minimizes the potential damage to the green if a pin with the invention attached is dropped.

The most preferred embodiment includes a styrofoam cover 400 outside of elongated plate 50, illustrated in FIG. 3. Cover 400 is similar in shape to elongated plate 50, and is slightly larger in size. Cover 400 has a center section 402, and end sections 404,406. Each end section 404,406 is held in place by bolts 106,108 passing through holes 408,410 on end sections 404,406. The styrofoam cover 400 minimizes the potential damage to the green from accidentally dropping the pin with the invention attached. The cover 400 is shown in phantom in FIG. 1, and omitted in FIGS. 2 and 4, so that other details of the invention may be displayed more clearly.

Figure 2:
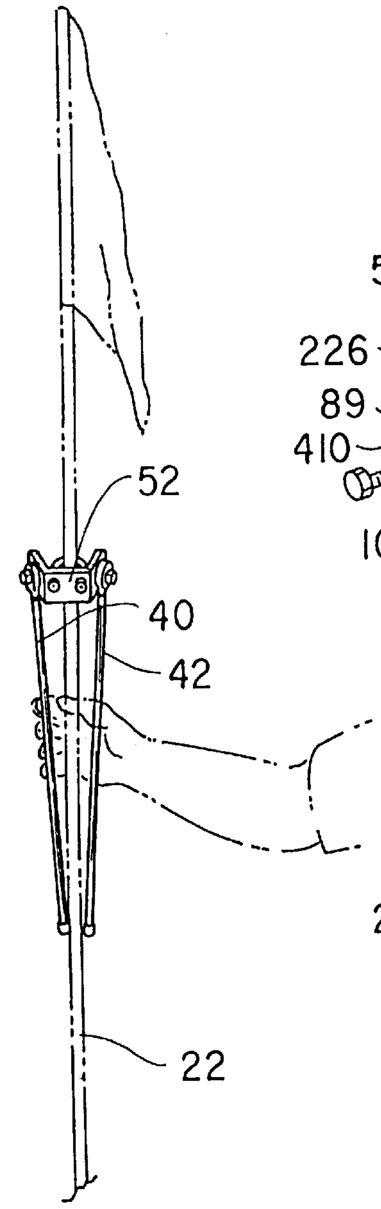
FIG. 2 is a side elevational view of the golf pin-stand with the pin-stand in a retracted non-use position with some elements removed for clarity of illustration.

Referring to FIGS. 1 and 3, the preferred embodiment also includes a chain 500 connecting each leg to the pin. Chain 500 includes lengths 502,504,506, each length having a first end 508,510,512, with all three first ends connecting together, and second ends 514,516,518. Each second end 514,516,518 is attached to a connector 520,522,524. Connectors 520,522 are each connected to leg members 40,42. Connector 524 is connected to the golf pin shaft 22. Chain 500 prevents the legs from moving past the desired position when they are in their extended position.

It should be noted that the golf pin-stand 10 may be an integral part of a golf pin 20 having the connector 30 permanently attached, for example by welding, to the a golf pin 20 at the time of manufacture. The preferred embodiment as described herein is intended to be a retrofit device using the connector 30 and an existing golf pin 20.

Figure 4:
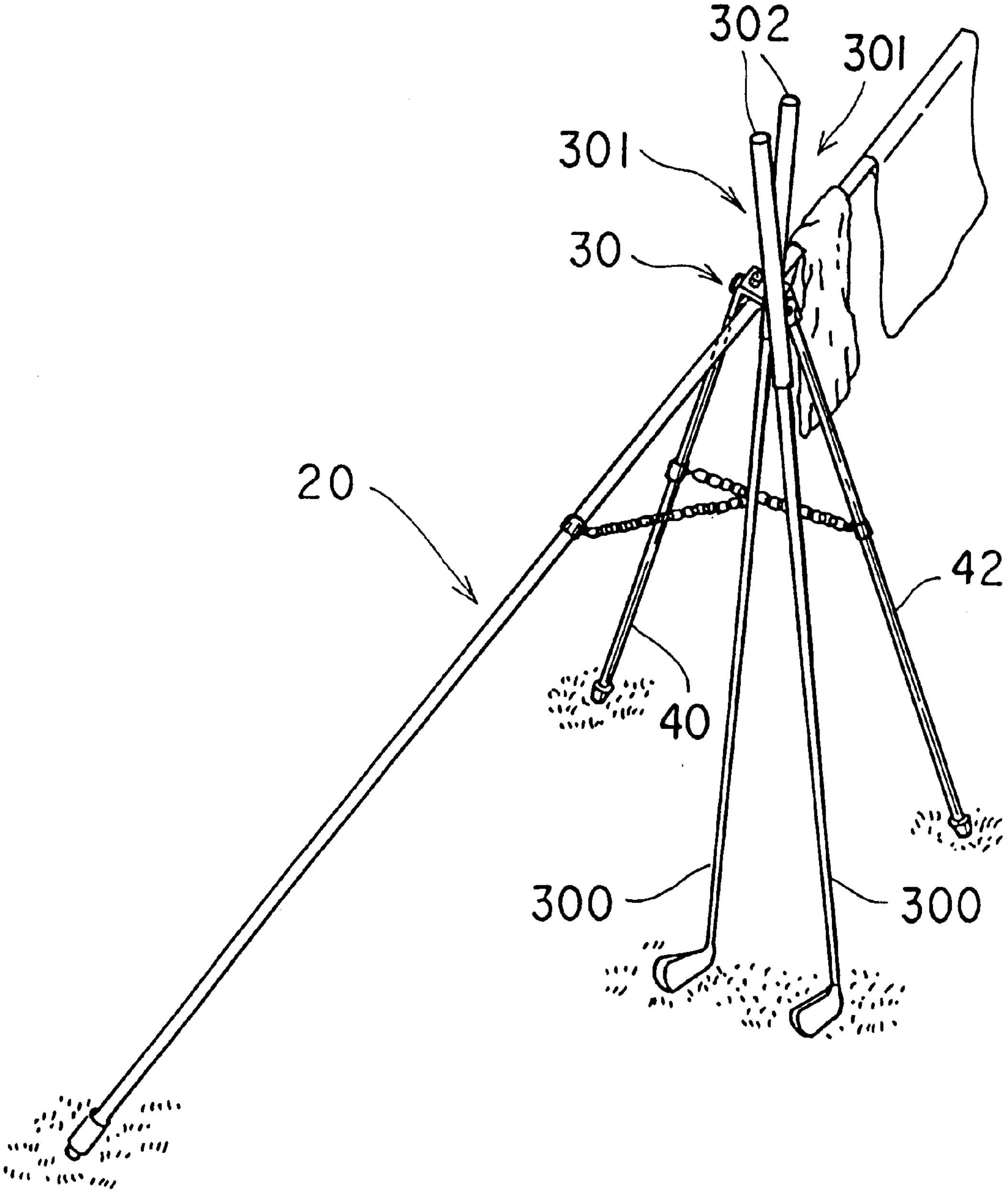
FIG. 4 is an environmental perspective view of the golf pin-stand in use and being further utilized to support a plurality of golf clubs.

Referring to FIG. 4, when the leg members 40, 42 are in an extended position substantially perpendicular to the shaft 22 of the pin 20 and the pin 20 is in a generally horizontal position, the pin-stand 10 can be used as a tripod to support at least one golf club 300 thereby keeping the golf club handle 301 high enough above the ground to keep the grip 302 clean and dry.

It is to be understood that the present invention is not limited to the sole embodiment described above, but encompasses any and all embodiments within the scope of the following claims.

I claim:

1. A golf pin stand device comprising:

a connector adapted to connect to a shaft of a golf pin, said connector having a substantially "U" shaped elongated plate, said elongated plate having an outside surface, an inside surface, a left end section, and a right end section, said connector being adapted to connect to the shaft with the shaft located between said left and right end sections adjacent to said inside surface;

wherein said elongated plate comprises a central section having two central apertures therein, a left end and a right end, and wherein said left end section projects at an obtuse angle from the left end of said central section and has a left end aperture therein, said right end section projects at an obtuse angle from said right end of said central and has a right end aperture therein;

wherein said connector includes a "C" bolt having two threaded free ends, each free end passing through one of said two central apertures, each free end being secured therein by a complementarily threaded nut type fastener; and a pair of leg members pivotally attached to said outside surface of said elongated plate, each of said leg members including an elongated rod, a pivotal rod cap, and a rod end cap, each elongated rod having a first end and a second end, each pivotal rod cap being attached to said first end of one of said rods and having a substantially flat protrusion with a pivotal rod cap aperture therein, each rod end cap being attached to said second end of one of said rods;

wherein said leg members pivot freely relative to said connector between a retracted position and an extended position, said leg members are substantially parallel to each other in the retracted position, said leg members are angularly separated in the extended position, and said connector is adapted to support a golf club when said leg members are in the extended position.

2. A golf pin stand according to claim 1, further comprising a styrofoam cover over the outside surface of said connector, said pivotal rod caps being located between said styrofoam cover and said connector.

3. A golf pin stand according to claim 1, further comprising a first and a second chain, each chain having a pair of ends, each of said leg members being attached to one of said ends of said first chain, one of said ends of said second chain being attached to said first chain, and one of said ends of said second chain being attached to said shaft.

4. A golf pin assembly, comprising in combination:

a golf pin having a shaft, said shaft having a vertical position and a substantially horizontal position;

a stand device having:

a connector connected to said shaft of said golf pin, said connector having a substantially "U" shaped elongated plate, said elongated plate having an outside surface, an inside surface, a left end section, and a right end section, said shaft being located between said left and right end sections adjacent to said inside surface;

wherein said elongated plate comprises a central section having two central apertures therein, a left end and a right end, and wherein said left end section projects at an obtuse angle from the left end of said central section and has a left end aperture therein, said right end section projects at an obtuse angle from said right end of said central and has a right end aperture therein;

wherein said connector includes a "C" bolt having two threaded free ends, each free end passing through one of said two central apertures, each free end being secured therein by a complementarily threaded nut type fastener; and a pair of leg members pivotally attached to said outside surface of said elongated plate, each of said leg members including an elongated rod, a pivotal rod cap, and a rod end cap, each elongated rod having a first end and a second end, each pivotal rod cap being attached to said first end of said rod and having a substantially flat protrusion with a pivotal rod cap aperture therein, each rod end cap being attached to said second end of said rod;

wherein said leg members pivot freely relative to said connector between a retracted position and an extended position, said leg members in the retracted position are substantially parallel to said shaft when said shaft is in the vertical position, said leg members in the extended position are substantially perpendicular to said shaft when said shaft is in the substantially horizontal position, and said connector is adapted to support a golf club when said leg members are in the extended position.

5. A golf pin assembly according to claim 4, further comprising a styrofoam cover over the outside surface of said connector, said pivotal rod caps being located between said styrofoam cover and said connector.

6. A golf pin assembly according to claim 4, further comprising a first and a second chain, each chain having a pair of ends, each of said leg members being attached to one of said ends of said first chain, one of said ends of said second chain being attached to said first chain, and one of said ends of said second chain being attached to said shaft.

* * * * *